United States Patent [19]

Balch

[11] Patent Number: 4,958,315

[45] Date of Patent: Sep. 18, 1990

[54] SOLID STATE ELECTRONIC EMULATOR OF A MULTIPLE TRACK MOTOR DRIVEN ROTATING MAGNETIC MEMORY

[75] Inventor: Kris S. Balch, San Diego, Calif.

[73] Assignee: The United States of America as represented by the Secretary of the Navy, Washington, D.C.

[21] Appl. No.: 751,350

[22] Filed: Jul. 2, 1985

[51] Int. Cl.$^5$ .................... G06F 3/00; G06F 12/00
[52] U.S. Cl. .................... 364/900; 364/927.81; 364/952.2
[58] Field of Search .................... 364/200, 900, 427.81, 364/452.2; 360/77; 365/230, 238

[56] References Cited

U.S. PATENT DOCUMENTS

| | | | |
|---|---|---|---|
| Re. 31,153 | 2/1983 | Caddell | 365/230 |
| Re. 32,075 | 1/1986 | Harrison et al. | 360/77 |
| 3,821,715 | 6/1974 | Hoff, Jr. et al. | 364/200 |
| 3,893,088 | 7/1975 | Bell | 365/238 |
| 3,895,360 | 7/1975 | Cricchi et al. | 365/230 |
| 4,006,457 | 2/1977 | Hepworth et al. | 365/230 |
| 4,016,547 | 4/1977 | Page | 364/900 |
| 4,145,745 | 5/1979 | DeBijl et al. | 364/200 |
| 4,164,041 | 8/1979 | Hartwell et al. | 365/238 |
| 4,295,205 | 10/1981 | Kunstadt | 364/900 |
| 4,396,959 | 8/1983 | Harrison et al. | 360/77 |
| 4,456,971 | 6/1984 | Fukuda et al. | 364/900 |

Primary Examiner—Salvatore Cangialosi
Attorney, Agent, or Firm—Harvey Fendelman; Thomas Glenn Keough

[57] ABSTRACT

A system for emulating the memory characteristics of a motor-driven rotating memory having multiple heads per track and/or single heads per track with odd modular memory lengths. It is intended as a cost effective alternative for replacing magnetic rotating memories. The emulation is accomplished by multiplexing an offset memory address during each bit time. Non-volatile memory arrays translate the memory address to an offset address that is proportional to the odd modular track length of the multiple/single head track. Input/output registers are used for each read/write head that is emulated. An emulation address controller is used to generate all timing and initial addresses.

17 Claims, 13 Drawing Sheets

*LOAD OCCURS WHEN $Q_0, Q_1, Q_2 \ldots Q_n = K_0, K_1, K_2 \ldots K_n$ OF TERMINAL COUNT. COUNTING SEQUENCE STARTS OVER AT COUNT ZERO ON NEXT COUNTER CLOCK.

FIG. 8

| ADDRESS IN (ADD) | ADDRESS OUT (DATA) | OFFSET |
|---|---|---|
| 0000 0000 0000 | 0000 0010 1101 | $45_{10}$ |
| 0000 0000 0001 | 0000 0010 1110 | $45_{10}$ |
| 0000 0000 0010 | 0000 0010 1111 | $45_{10}$ |
| 0000 0000 0011 | 0000 0011 0000 | $45_{10}$ |
| 0000 0000 0100 | 0000 0011 0001 | $45_{10}$ |
| 0000 0000 0101 | 0000 0011 0010 | $45_{10}$ |
| 0000 0000 0110 | 0000 0011 0011 | $45_{10}$ |

SOLID STATE ELECTRONIC EMULATOR OF A MULTIPLE TRACK MOTOR DRIVEN ROTATING MAGNETIC MEMORY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Floppy disks, memory drums, fixed disks, hard disks, winchester disks, and similar systems are classified as motor-driven rotating memories. All of them are dependent on a rotational mall composed of a magnetic media. This magnetic media is susceptible to reliability problems. These reliability problems result in loss of data and mechanical dependencies. Temperature sensitivities, head crashes (read/write heads striking the media surface), sensitivities to magnetic fields, and dependencies on consistent rotational speed for timing/retrieval of data are all contributing causes to the reliability problems. Computer systems that use a rotating memory for a storage element or for a controller require the data to be in a prescribed format and timing sequence. Reliability problems with magnetic memories necessitate the development of a more cost effective and reliable method of storage. To be cost effective, the interface and operating specifications of the computer system's memories would require emulation of the motor-driven rotational memory in order to replace it. Some of the characteristics to emulate may include odd memory lengths (non modular) for the memory tracks (i.e. 2304 bits, 166 bits, 312 bits), multiple read-write heads per track, or a single head per track. Replacement with conventional solid state memory systems could require extensive modification of such a system. To simplify the replacement of this memory, a one-to-one substitution with a solid state emulator will be the most cost effective modification to present systems.

SUMMARY OF THE INVENTION

The present invention overcomes the foregoing shortcomings of prior art designs and systems and emulates the memory characteristics of a motor-driven rotating memory having multiple heads per track and/or single heads per track with odd modular memory lengths without the use of delay lines. The present invention is intended as a cost effective alternative for replacing magnetic rotating memories.

The multiple/single head odd modular memory length and emulation of rotating magnetic drums is accomplished by multiplexing an offset memory address during each bit time. Non-volatile memory arrays are used to translate the memory address to an offset address which is proportional to the odd modular track length of the multiple/single head track. Random accessibility in the memory addressing scheme is required when a multiple head track is emulated. This is due to the multiplexing of several offset memory addresses in a single bit time. The present invention utilizes binary registers to emulate each read/write head of the rotating magnetic drum system that is being emulated. An emulation address controller is used to generate all timing and initial addresses.

Multiple heads per track and/or single head per track rotational memories can have odd memory lengths. This odd memory length in a binary base system does not have an equivalent replacement with standard modular length (i.e. 256, 512, 1024, 2048, 4096, etc.) conventional (solid state) memories. This odd memory length does not allow use of conventional memories in standard addressing schemes. The present invention uses non-volatile memory arrays to perform offset address decoding, thereby allowing the application of conventional memories to odd memory lengths.

The present invention has the following advantages over prior art techniques and over magnetic rotational memory drums. The present design utilizes solid state electronics which are far less sensitive to temperature changes than magnetic media used in most rotational memories. The present invention is, therefore, thermally stable. The present invention uses less by reason of its solid state electronics than rotational types of memories. The design of the present invention permits quieter operation due to the utilization of solid state electronics which inherently reduces the noise level because there are no moving parts or mechanical vibrations. Further, the present invention is lighter weight than rotationsal memories since its solid state components are a mere fraction of the weight of rotational memories. The design of the present invention reduces the physical size required to replace an equivalent rotational memory because of high density miniature solid state memories, no moving parts and no limitation with media and packaging techniques. The present invention is cost effective when replacing rotational memories which are antiquated, unreliable and require continued operation in the machine or device which they interface. Further, the present invention exhibits improved reliability over rotational memories due to the media type, power requirements, thermal stability and lack of rotational or other moving masses. No adjustments or alignments are required for utilization of the present invention, whereas most rotational memories require some head alignment or other mechanical adjustments.

Another important advantage of the present invention is that it achieves absolute signal recognition. The logic "1" or logic "0" output from the emulator of the present invention removes any question of the digital value of the data. With inductive type read heads, the signal interpretation is dependent on a flux change at the head. In the past this has resulted in unintelligible waveforms which are required to be processed in order to recover the signal.

Still further advantages of the present invention include adjustable memory length, adjustable memory speed and static operation. The emulator disclosed allows for shorting or lengthening the maximum memory length by changing one binary word (terminal count). The maximum length is determined by the maximum length of the type of solid state memory used. This has great implications for use in applications of rotational memories used as microsequencers. The adjustable memory length allows future upgrades of more complex programs without replacing the old hardware for a larger capacity rotational memory. The design of the present invention includes a bit clock which can be adjusted either faster or slower. The maximum speed is determined by the type of solid state memory used in the design. To accomplish this with a rotational memory, the replacement of the drive motor and some mechanical dependent hardware would be required whereas with the present design it requires only the exchange of a crystal oscillator. The invention disclosed can be operated in a static condition which allows for better trouble-shooting of the electronics. To accomplish the same static operation on a rotating memory, the rotating memory would have to be stopped from rotating, advanced by one bit position and the flux change read during its single bit advancement. This, of course, is very difficult to accomplish with the rotational memory. However, with the solid state emulator of the present invention it is entirely unnecessary.

OBJECTS OF THE INVENTION

Accordingly, it is the primary object of the present invention to disclose a system for emulating a multiple track motor-driven rotational magnetic memory using solid state electronics which are thermally stable, require less power, are quieter in operation, are lighter weight, have reduced physical size, are cost effective, have improved reliability, require no alignment, and have absolute signal recognition.

It is a further object of the present invention to disclose an emulator for a multiple track motor-driven rotating magnetic memory that is implemented in solid state electronics and has adjustable memory length, adjustable memory speed and is capable of static operation to enable efficient trouble-shooting.

A further object of the present invention is to disclose a system for emulating a motor driven multiple track rotating magnetic memory without the use of delay lines.

These and other objects of the present invention will become more readily apparent from the ensuing specification when taken together with the drawings.

DESCRIPTION OF THE PREFERRED EMBODIMENT

Figure 1:
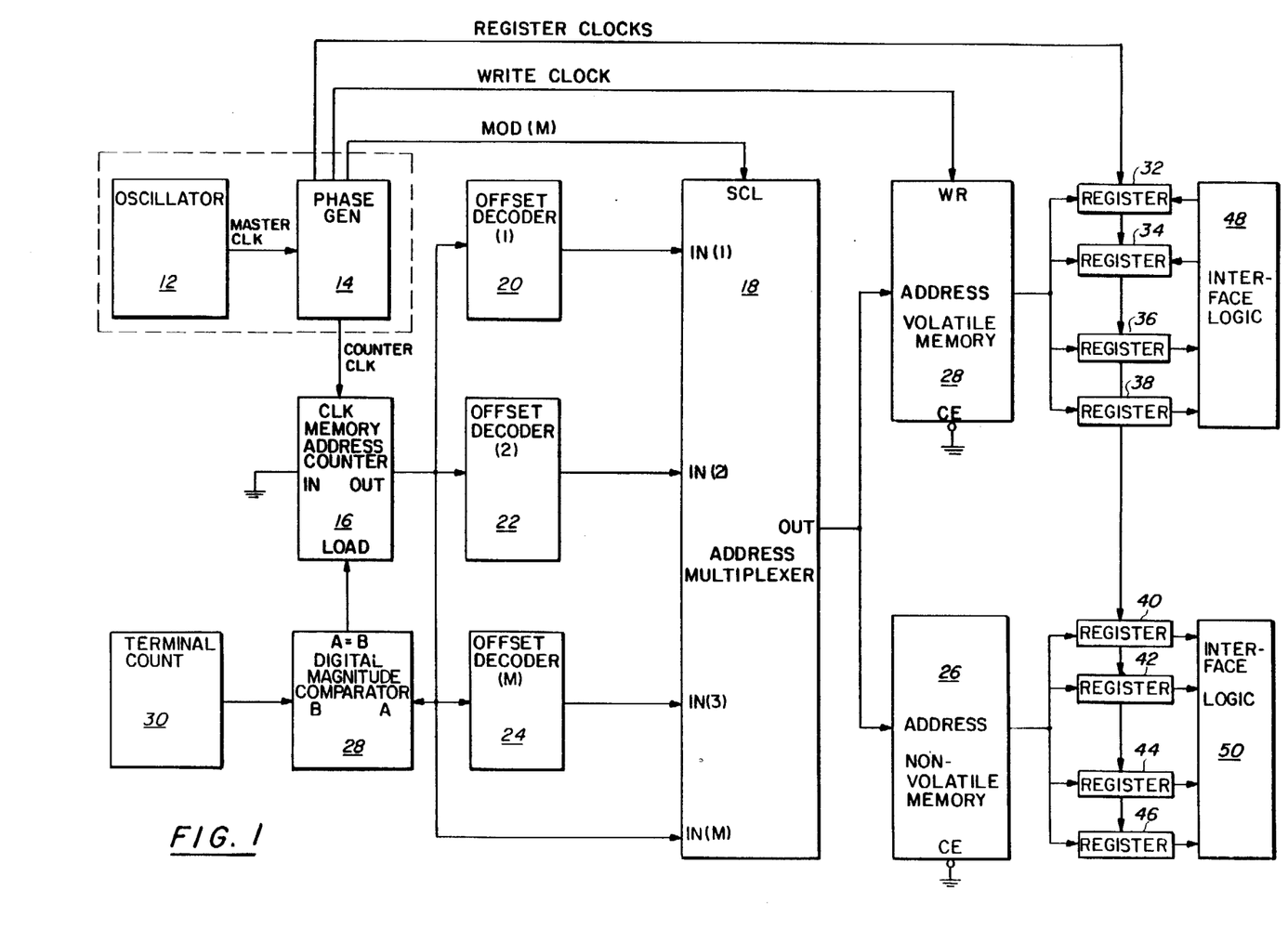
FIG. 1 is a block diagram of the emulator system of the present invention.

Referring now to FIG. 1 the overall system of the present invention will be described with a further detailed description of each block shown in FIG. 1 being provided later in this specification. The following description will attempt to correlate the digital design of the present invention to its mechanical magnetic counterpart.

The oscillator 12 of the present invention is related to the rotational speed of the motor driving the rotational magnetic drum memory. Oscillator 12 forms the basic timing for the entire emulator of the present invention. Oscillator 12 clocks the phase generator 14. Phase generator 14 is comprised of a shift register and phase decoding logic which controls all the clocking within the emulator. Phase generator 14 clocks the memory address counter 16, cycles the address multiplexer 18, creates the write clock for the volatile memory (to be described) and clocks the read/write registers (to be described). This clocking has no direct relationship to the rotational memory except to emulate the same inherent functions found in a motor-driven rotational memory. The memory address counter 16 is clocked by the phase decoding logic signal which is referred to as the "counter clock". The memory address counter 16 is used to address the offset decoders 20, 22 and 24, the non-volatile memory 26 and the volatile memory 28. Memory address counter 16 counts from address (zero) to the maximum address of the rotational memory being emulated. The maximum memory address is predetermined by the digital magnitude comparator 28 and a fixed binary word referred to as terminal count 30. The terminal count binary word 30 is one bit less than the maximum address to be counted. When the memory address counter 16 reaches this address, the digital magnitude comparator 28 sends a signal to the load line of the memory address counter 16. On the next clock from the phase decoding logic (counter clock), the memory address counter is loaded with a count of (zero). This completes one electronic revolution equivalent to one revolution of the magnetic rotational memory being emulated. Therefore, the memory address counter 16, the digital magnitude converter 28 and the terminal count 30 emulate the rotational timing characteristics of each rotational memory's revolution. The memory address counter 16 continues to repeat this pattern.

The memory address counter 16 drives the memory address offset logic that is comprised of the offset decoders 20, 22 and 24 as well as the address multiplexer 18. The offset decoders 20, 22 and 24 are used to translate the address of the memory address counter 16 to an address which is offset by a fixed amount. The fixed amount is determined by the characteristics of the rotational magnetic memory being emulated. This relates to the rotational memory's multiple heads per track method of reading/writing data. The memory address counter 16 also drives the address multiplexer 18. The address multiplexer 18 is used to cycle the memory address counter 16 and the translated offset addresses to the non-volatile memory 26 and the volatile memory 28 in sequential order. This relates to the rotational magnetic memory drum's characteristics of being capable of reading/writing simultaneously from multiple positions on each track during one bit time with multiple heads per track. It is noted at this point that a bit time is defined herein as the time it takes to complete one revolution (rotational memory) divided by the maximum number of bits per track. The sequential order of cycling the offset addresses and memory address counter 16 addresses is determined by the phase decoding logic. The address multiplexer cycles the address to the non-volatile and volatile memories 26 and 28, respectively. When the address is stable, the data may be written or read into the appropriate one of the data registers 32, 34, 36, 38, 40, 42, 44, 46. The speed at which the volatile memory 28 can be written into is determined by the phase decoding logic. The volatile memory's 28 equivalent function on a rotational memory is the data storage tracks.

The registers 32, 34, 36, 38, 40, 42, 44 an 46 into which data is either written or read are clocked sequentially by the shift register's decoding logic in sequence with the corresponding address of the address multiplexer 18. This sequencing of addresses with the register clocking in the method by which data is written/read simultaneously to/from multiple positions during one bit time. The registers 32, 34, 36, 38, 40, 42, 44 and 46 are equivalent to the read/write heads of the rotational memory being emulated. This clocking of data in sequence with the address of the address multiplexer 18 is the method used to emulate the multiple heads per track in a rotational drum type memory.

The non-volatile memory 26 has the same timing as described with respect to the volatile memory 28 except for the write function. Being non-volatile implies that data is read in only. The write clock is not used and only read registers are clocked. This corresponds to permanent type of storage on a rotational memory. It is noted at this point that prior to operation of the system illustrated in FIG. 1, data is entered into non-volatile memory 26. It is also noted that data is entered into volatile memory 28 via interface logic 48 and the appropriate ones of registers 32, 34, 36 and 38. The read/write registers should be buffered and translated to the logic levels of the interface 48 or 50 with which the rotational memory was connected.

The following descriptions will detail the function and operation of each block illustrated in FIG. 1.

Oscillator 12 utilizes synchronous timing techniques. All timing is derived from a master clock. The frequency of the master clock is related to the RPM of the rotational drum memory being emulated by the following relationships:

Master clock (HZ) = PGC × RPM/60 × BPT where RPM is the rotational memory's revolutions per minute,
BPT are bits per track (memory length) and
PGC are the phase generator clocks
(number of clocks per cycle).

A crystal oscillator 12a is used for stability. This stability should be equal to or exceed the accuracy of the slip error of the rotational memory's motor where $$\text{Slip error} = \frac{\text{Slip RPM} - \text{Memory RPM} \times 100}{\text{Slip RPM}} \leq \text{Oscillator Stability}$$

Figure 2:
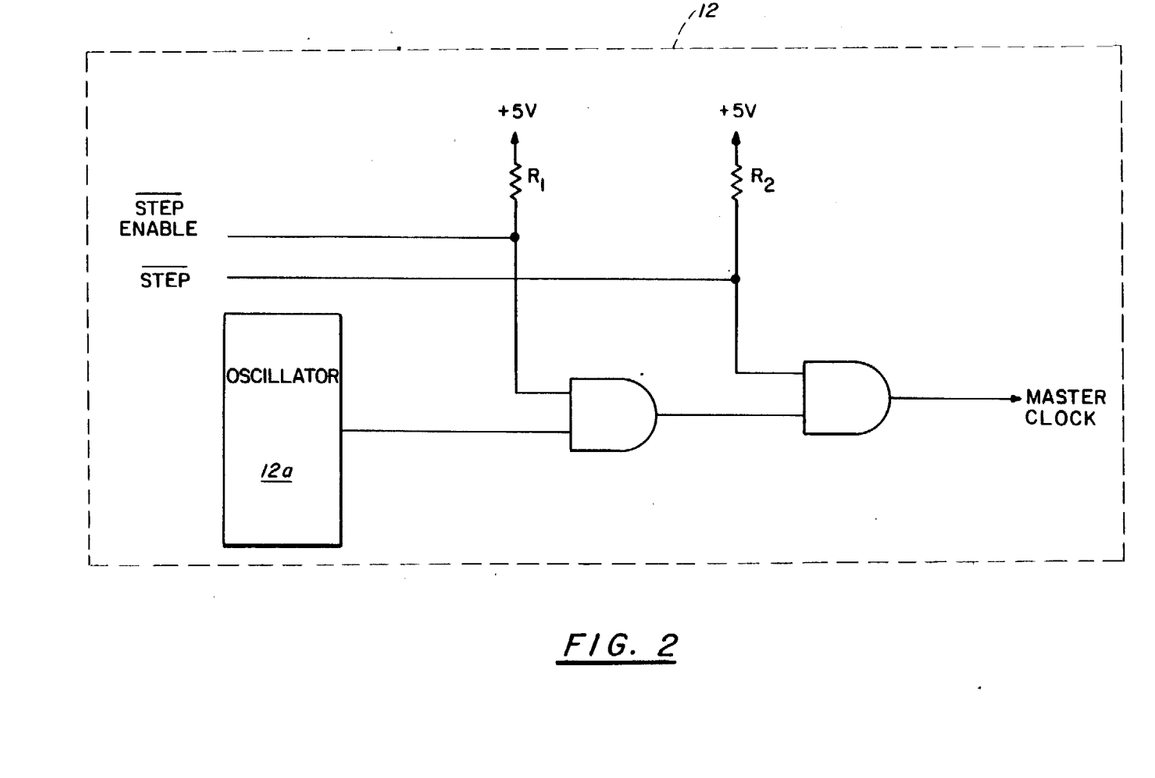
FIG. 2 is a block diagram of the clock generator portion of the present invention.

Single step control of the master clock is possible by disabiling the oscillator's clock logically and substituting a static clock for single stepping as is illustrated in FIG. 2. This enhances the trouble shooting capability of the design by allowing both static and dynamic testing.

Figure 3:
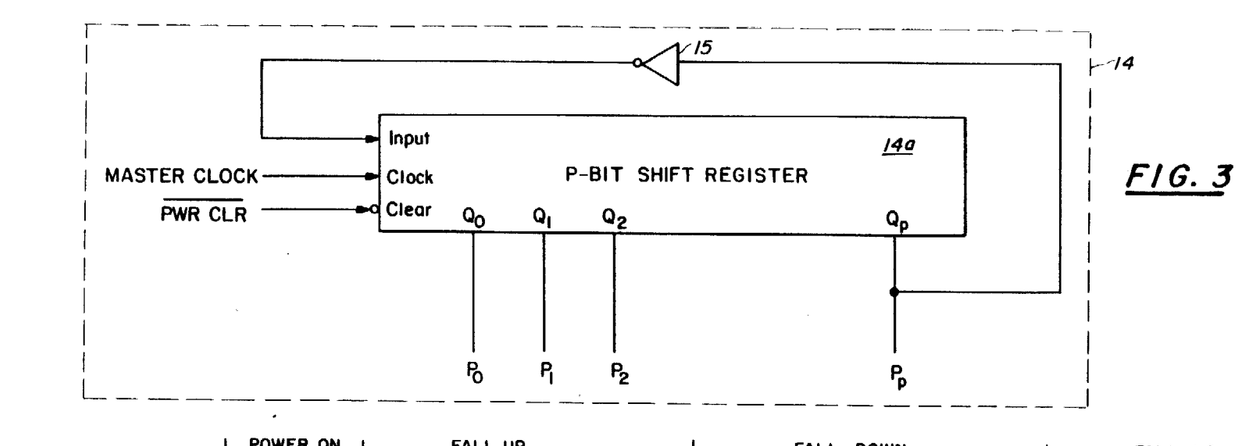
FIG. 3 is a block diagram of a portion of the phase generator illustrated in FIG. 1.
Figure 3A:
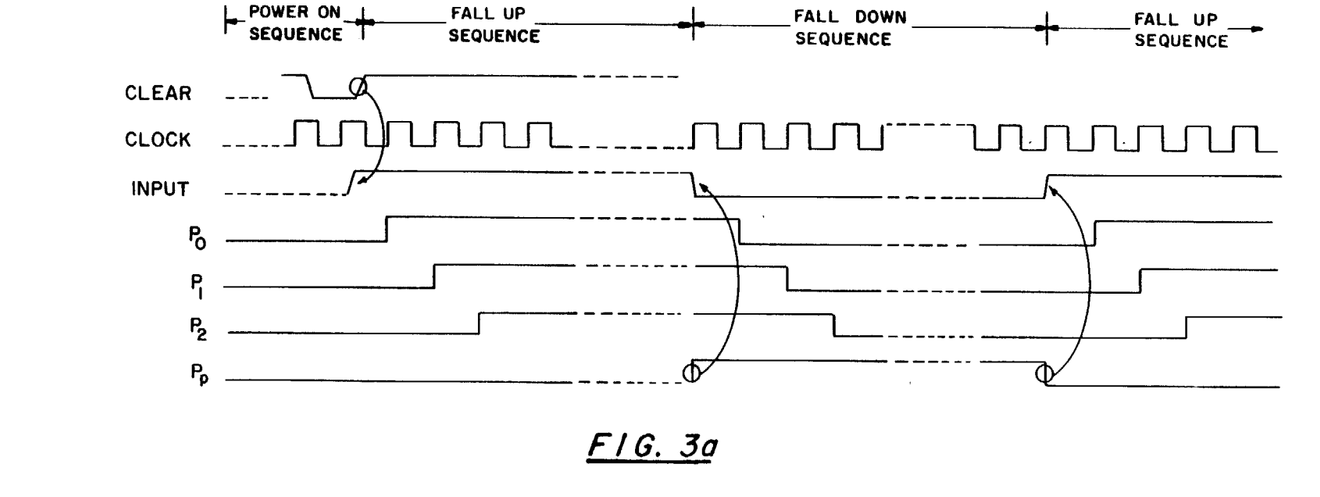
FIG. 3a is a timing diagram of the shift register illustrated in FIG. 3.
Figure 4:
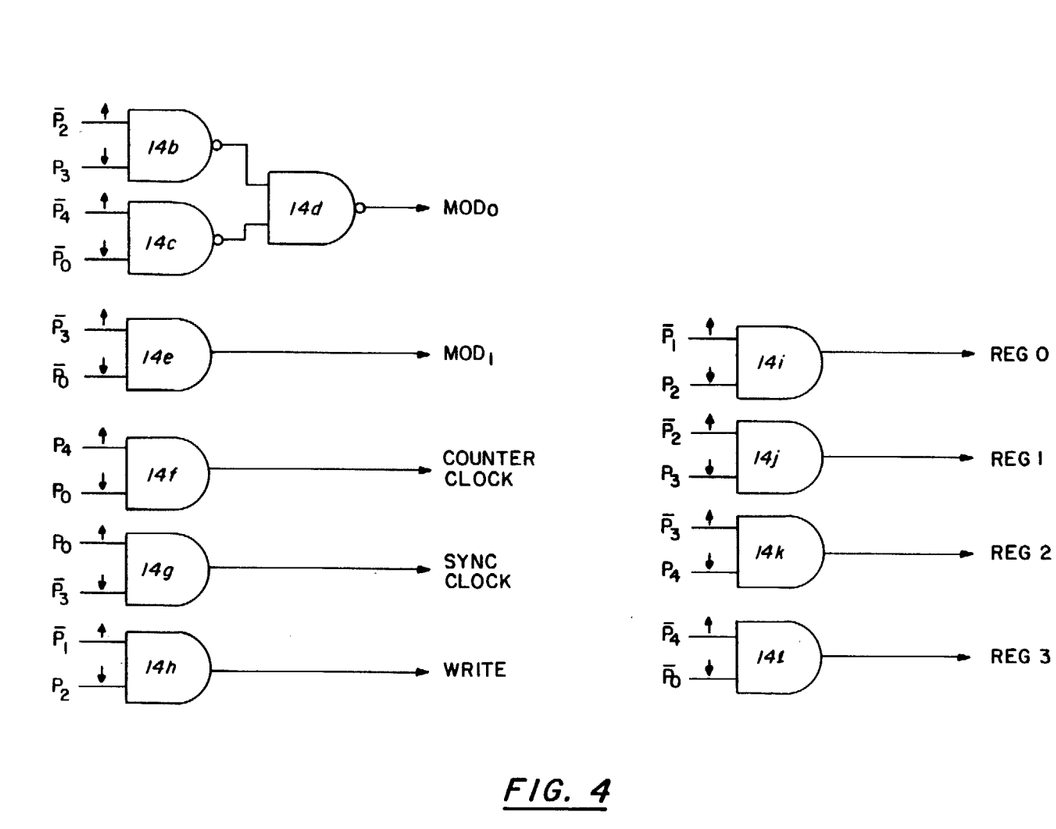
FIG. 4 is a block diagram of a five-state phase decoder that comprises a portion of the phase generator illustrated in FIG. 1.

Referring to FIG. 3 it can be seen that the phase generator 14 of the present invention is comprised of a shift register 14 and the phase decoding logic illustrated in FIG. 4. The shift register 14a is of a length P bits wide where P equals 16 bits in the present example. Shift register 14a is used to generate a "waterfall" logic sequence. This could be called a Johnson counting sequence. The timing diagram associated with shift register 14a is shown in FIG. 3a. The shift register 14a is clocked by the master clock from oscillator 12. Upon power up, the shift register 14a must be initialized to an all zero state. This is normally accomplished by a master clear signal PWR CLR or by parallel loading logic zeros via the parallel inputs and the load line. Once initialized, the following description will hold true until power is removed or an interruption such as a master clear is made on the shift register 14a. The start of the sequence is considered when the shift register is completely filled with all zeros. The input to the shift register 14a is the inverted output of the last stage that is accomplished by means of inverter 15. For each clock the shift register 14a will shift the logic level present on its input by one position through the register. This will continue until the last stage Qp shifts out the logic level which was originally applied at the beginning of the sequence to the input Qo. This sequence is repeated on a "fall up" and a "fall down" sequence which produces the "waterfall" effect in the timing diagrams of FIG. 3a. The length of the sequence is the width of the shift register, P-bits, multiplied by two. The output of each stage in the shift register 14a is used to derive complex control signals which are "glitch free". The outputs will be called phases and will be referenced to as $p_o$ to $p_p$. To derive the control signals for the memory emulator, the shift register 14a phases must be decoded by logic gates. An example of a 5-bit shift register's decoding logic is shown in FIG. 4. Expansion of this decoding scheme is limited by the length of the shift register. The decoding logic is comprised of NAND gates 14b, 14c and 14d connected as illustrated, AND gates 14e, 14f, 14g and 14h and AND gates 14i, 14j, 14k and 14l, all connected as illustrated. The control signals needed to manipulate the memory for rotational emulation are;

Mod (m)—Signals used to control which input to the multiplexer is selected and what order they are selected. These signals are a straight binary counting sequence.

Counter clock—Signal used to clock the memory address counter 16 (N-bit length) at a frequency equal to the inverse of the number of bits/revolution multiplied by the number of seconds it takes to make 1 revolution.

Bit clock—Signal used to indicate each bit interval of the emulated rotating memory. It has the same frequency as the counter clock but it can have a different period.

Sync clock—Signal is used to synchronize external hardware. It indicates a reference point (i.e. start of revolution, index, sync, etc.) from which revolution to revolution will be marked.

Write—Signal used to synchronize the writing of information into volatile memory during which data and addressing are stable.

Register Write (r)—Signals used to clock data into read and write registers. These signals are synchronized with the MOD (m) signals. This assures a stable setup time for addressing the volatile and non-volatile memory through the address multiplexer.

Figure 5:
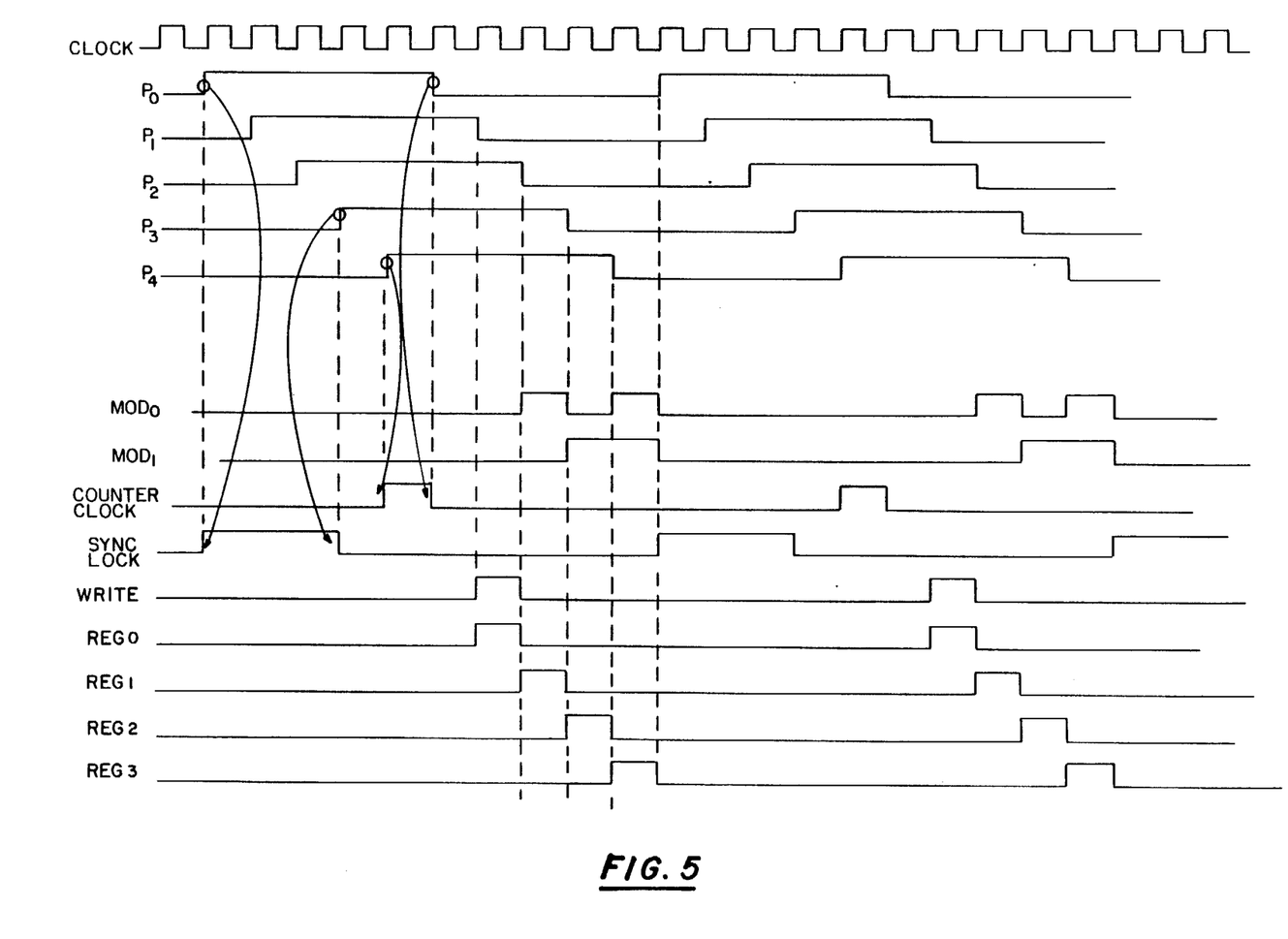
FIG. 5 is a timing diagram of the signals pertaining to the five-state phase decoder illustrated in FIG. 4.

In the example (timing diagram of FIG. 5)), register write (0) is synchronized with the write signal. Therefore, register (0) would be an input register and register (1), register (2), and register (3) would be output registers. FIG. 5 represents how these control signals are derived from the shift registers. These signal's functions are:

Mod (0)—Signal used in conjunction with mod (1) to select the input to the address multiplexer 18.

Mod (1)—Signal used in conjunction with mod (0) to select the input to the address multiplexer 18.

Counter clock—Signal used to clock the memory address counter 16.

Bit clock—Signal used to clock data for each bit interval.

Sync clock—Signal used to indicate start of cycle (revolution).

Write—Signal used to write data into the volatile (RAM) memory 28.

Register write (0) thru (3)—Signals used to clock register (0) through register (3) for latching data in conjunction with mod (0) and mod (1) selection of address multiplexer's inputs.

The timing relationship for these signals are shown in FIG. 5.

Figure 6:
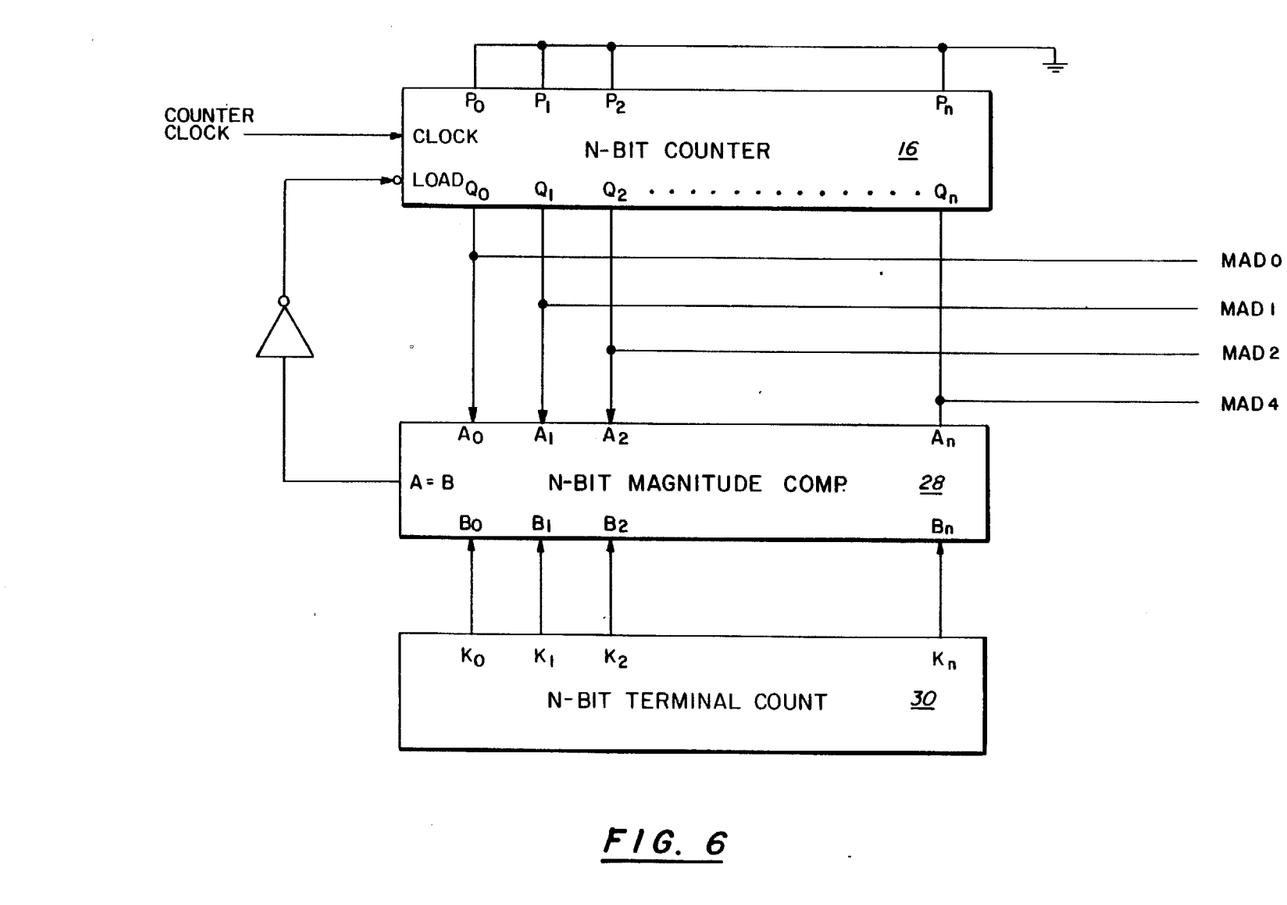
FIG. 6 is a block diagram of the memory address counter, digital magnitude comparator and terminal count of FIG. 1.

The memory address logic consists of a binary counter 16, digital magnitude comparator 28 and a terminal count (count limit) module 30. All the logic in this section has a binary word length of N bits. The memory address logic provides a common address sequencing to all the non-volatile and volatile memories. The addressing is a straight binary sequence.

The memory address counter (MAC) 16 is used to sequence the non-volatile and volatile memories (PROM/RAM) 26 and 28, respectively, from the starting address to the ending address. Its counting sequence is straight binary and is determined by the number of bits (n).

Figure 7:
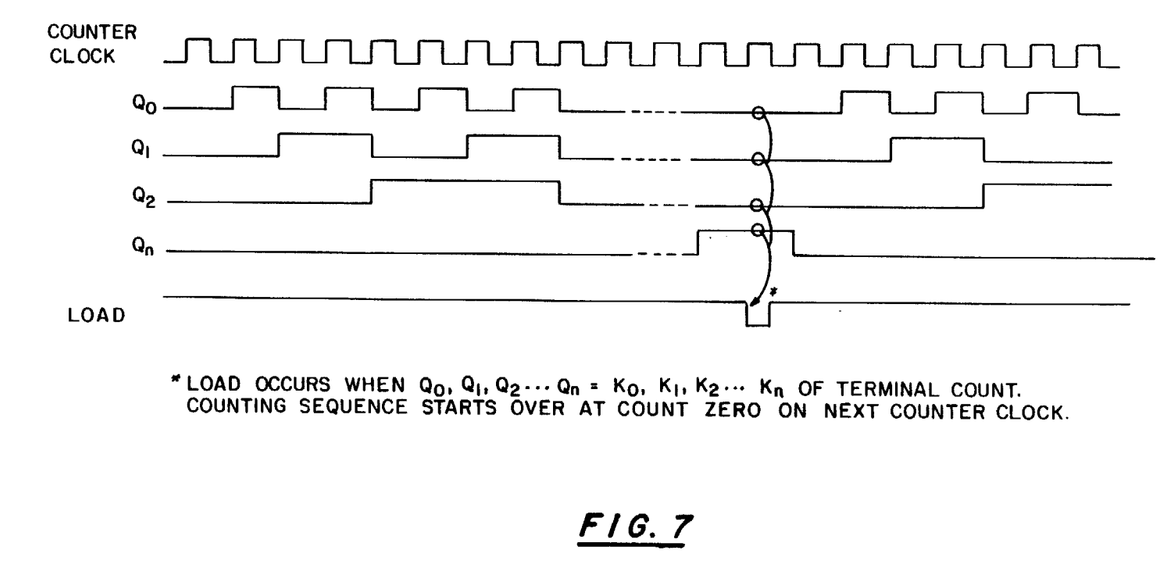
FIG. 7 is a timing diagram associated with the memory address logic illustrated in FIG. 6.

The maximum count of the MAC 16 is determined by the terminal count module's, 30 binary word of N bits. The binary word is compared to the output (binary value) of the MAC 16 via the digital magnitude comparator (DMC) 20. When the two binary words are equal in magnitude the MAC 16 will be parallel loaded with a count of zero on the next counter clock. The loading of zeos into the MAC 16 is called a terminal count sequence. This terminal count sequence is equivalent to the completion of one revolution of a rotational memory. If the memory's maximum length doesn't exceed the capacity of the solid state memories, the terminal count 30 binary word may be adjusted to change the capacity of storage for the emulator. The logic diagram and timing sequence of the memory address logic are shown in FIG. 6 and FIG. 7, respectively.

Figure 8:
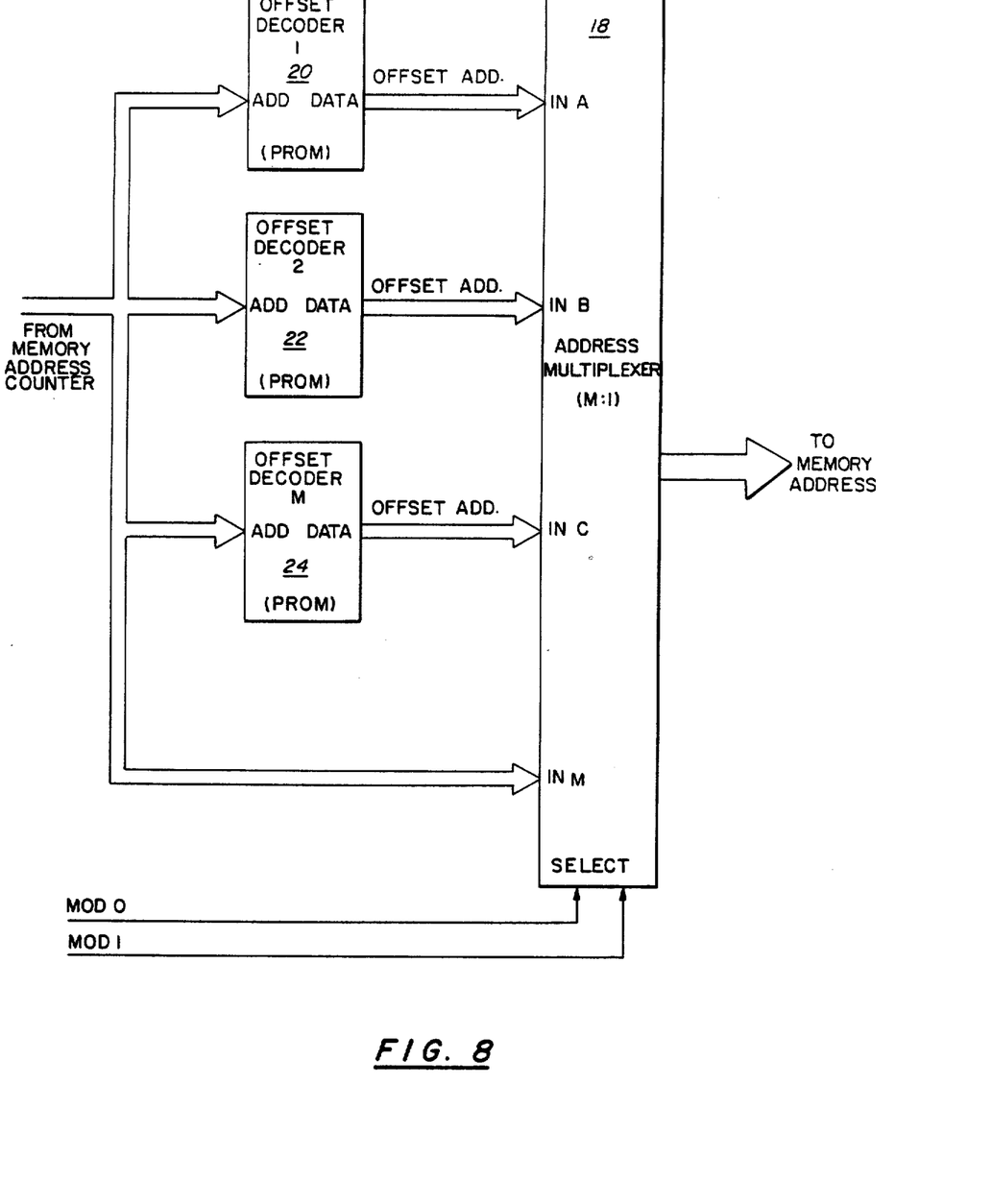
FIG. 8 is a block diagram of the memory address offset logic portion of the present invention including the offset decoders and the address multiplexer.

The memory address offset logic consists of the set of offset decoders 20, 22 and 24 and the address multiplexer 18. The offset decoders 20, 22 and 24 are non-volatile memories (PROMS) and are driven by the MAC 16. The offset multiplexer 18 has M number of channels. The number M of channels is determined by the number of read/write heads which are not in adjacent physical position on the rotational memory being emulated. The logic diagram further illustrating the offset logic is shown in FIG. 8.

Figure 9:
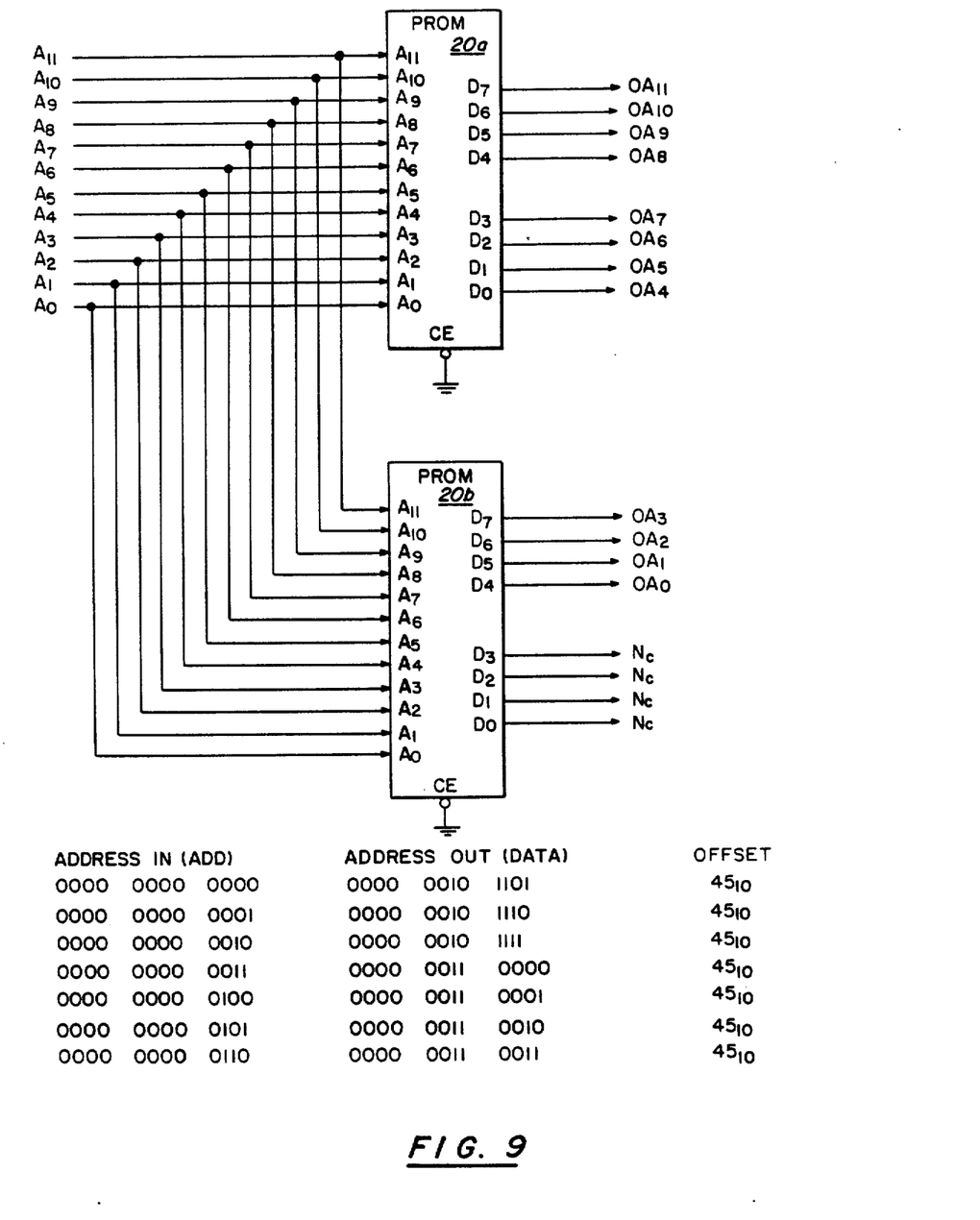
FIG. 9 is a detailed block diagram, by way of example of an offset decoder programmed to provide an offset of 45 (binary). The bottom of FIG. 9 illustrates the address that is input into the offset decoders and the address that is outputted by them.

The offset decoders 20, 22 and 24 must have the same address capacity as the MAC's 16 addressing range. The function of the offset logic is to translate an address by a predetermined offset value. An example is shown in FIG. 9 for a 12 bit offset decoder with an offset programmed for 45 (binary). By applying an address of 0 (binary) at the input of the PROMS, the output is 45 (binary). Similarly, applying an address of 1 (binary) at the input, the output address is translated to 46 (binary). This continues for a full counting range of 12 bits. For a given 12 bit binary word the output will offset the address by 45 (binary). When the full counting range (terminal count 30) has been reached, the offset decoder will translate the output by 45 (binary) from the beginning count of (0). In this example, two PROMS 20a and 20b are used by way of example to form a 12 bit address range for the output.

Figures 10, 10A:
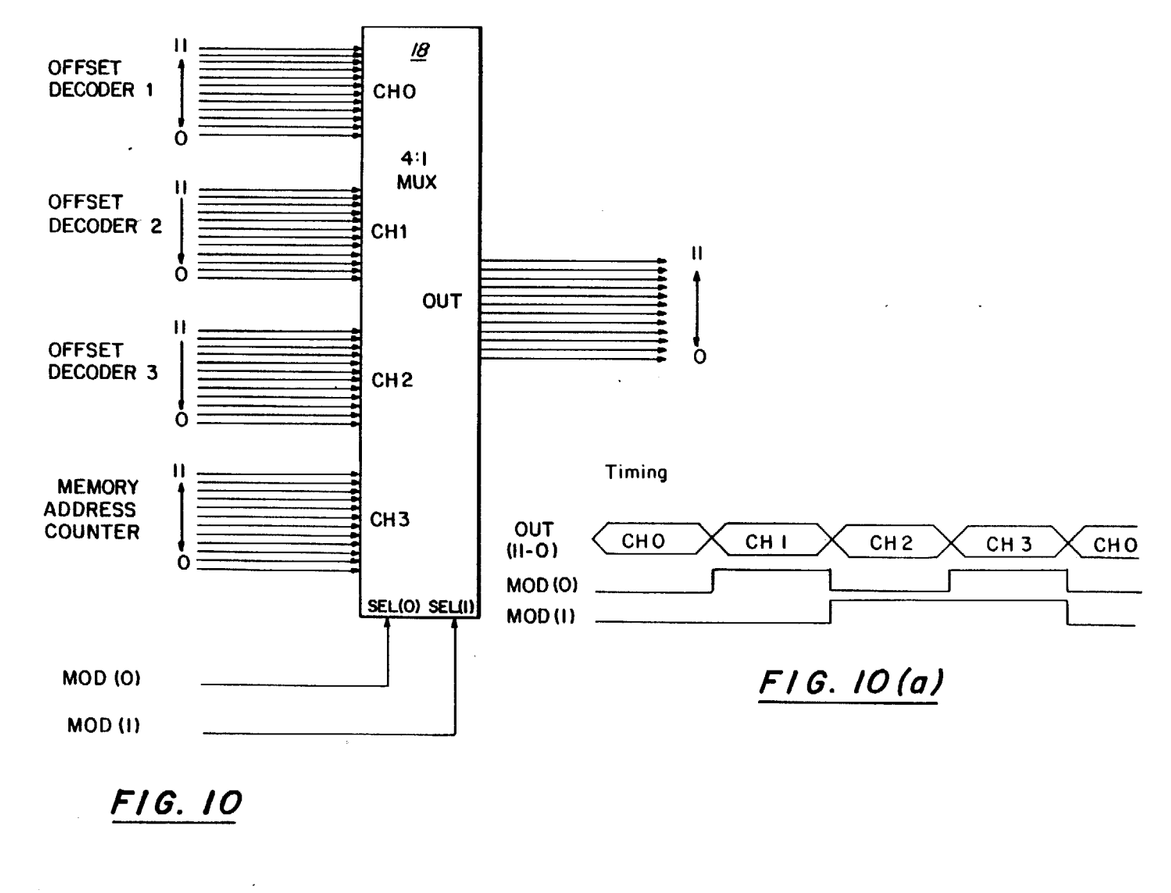
FIG. 10 is a block diagram of the address multiplexer illustrated in FIG. 1.
FIG. 10a is a timing diagram associated with the address multiplexer of FIG. 10.

The function of the address multiplexer 18 is to switch the different offset addresses and MAC 16 address to the non-volatile and volatile memories 26 and 28, respectively, in a sequential order. The multiplexing of all offset addresses must occur during each bit clock period. The effect this multiplexing creates is as though multiple memory tracks, as on a rotational memory, are being accessed simultaneously during each bit clock period. This emulates the rotational memory multiple head multiple track addressing. The sequencing of the address multiplexer 18 is controlled by the select lines. The number of offset addresses required will determine the nearest modular number of control lines. As an example, if 5 offset addresses need to be multiplexed, the nearest modular number of control is 3. These 3 lines would control an 8 to 1 multiplexer. In FIG. 10, the offset multiplexer 18 is shown as a 4 to 1 multiplexer with two control lines called MOD (0) and MOD (1). The timing is shown in FIG. 10a for the sequencing of the offset addresses. The width of the address multiplexer 18 is determined by the width of the offset decoders 20, 22 and 24. The width of the offset decoders is determined by the addressing range of the MAC 16. In FIG. 10, the address multiplexer is 12 bits wide.

Figure 11:
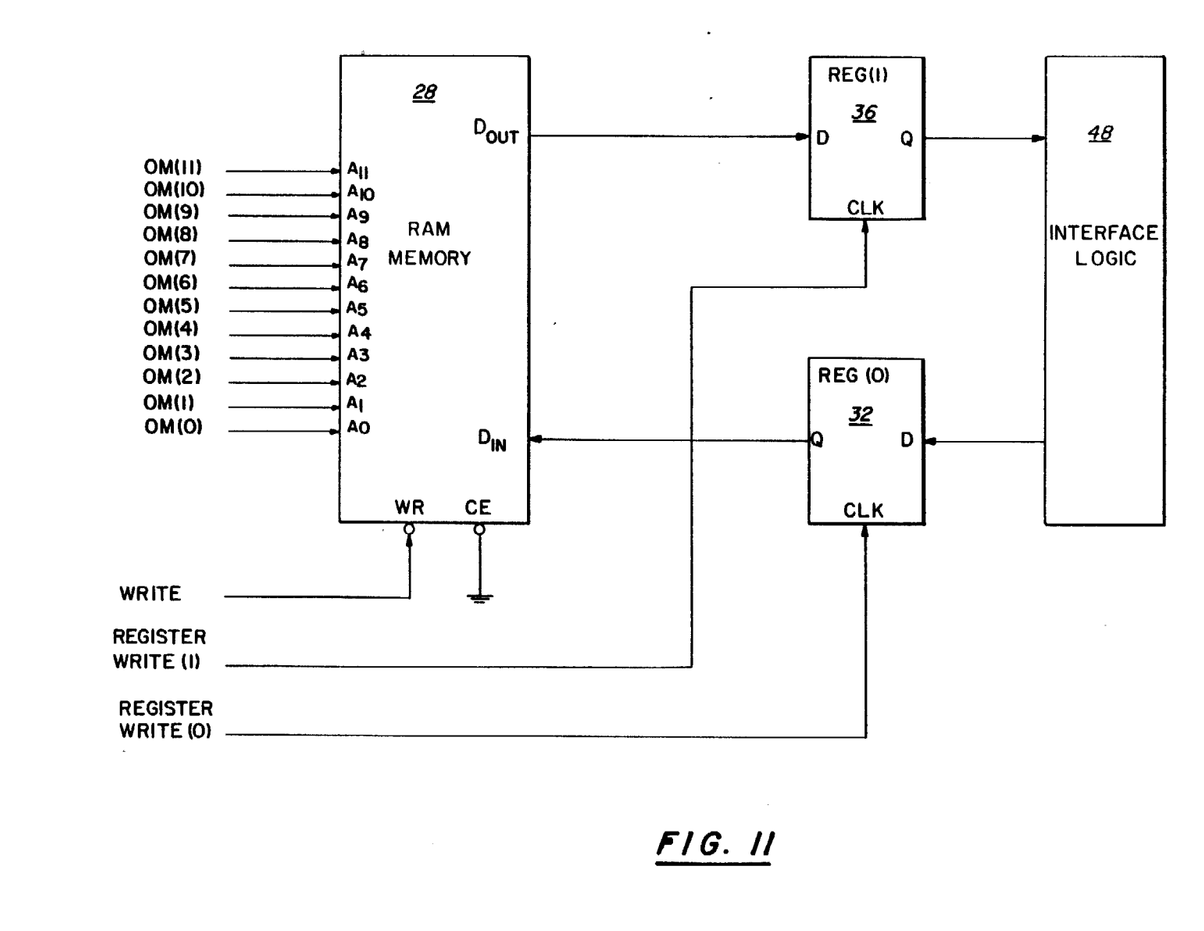
FIG. 11 is a block diagram illustrating the volatile memory and interface of the present invention.
Figure 12:
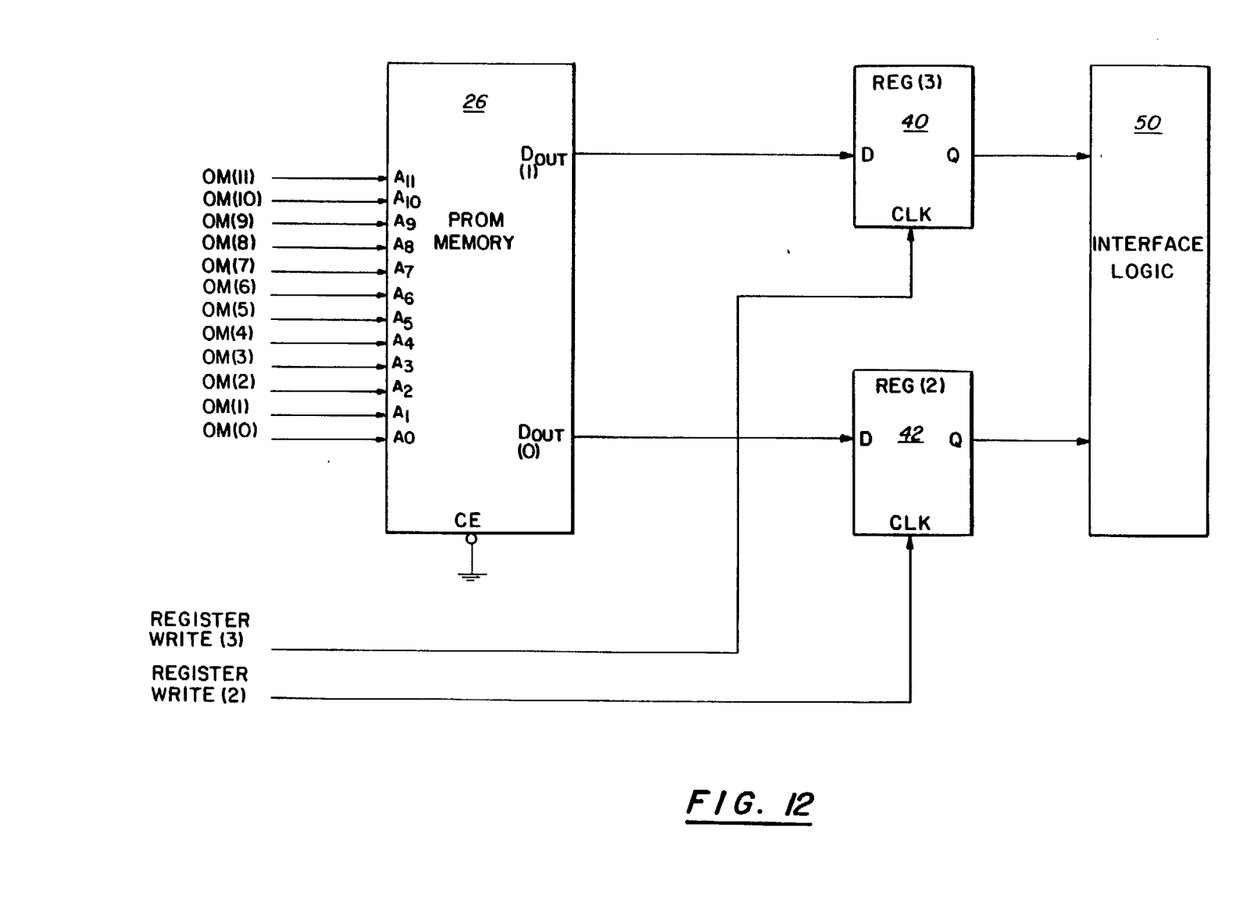
FIG. 12 is a block diagram illustrating the non-volatile memory and logic interface of the present invention.
Figure 13:
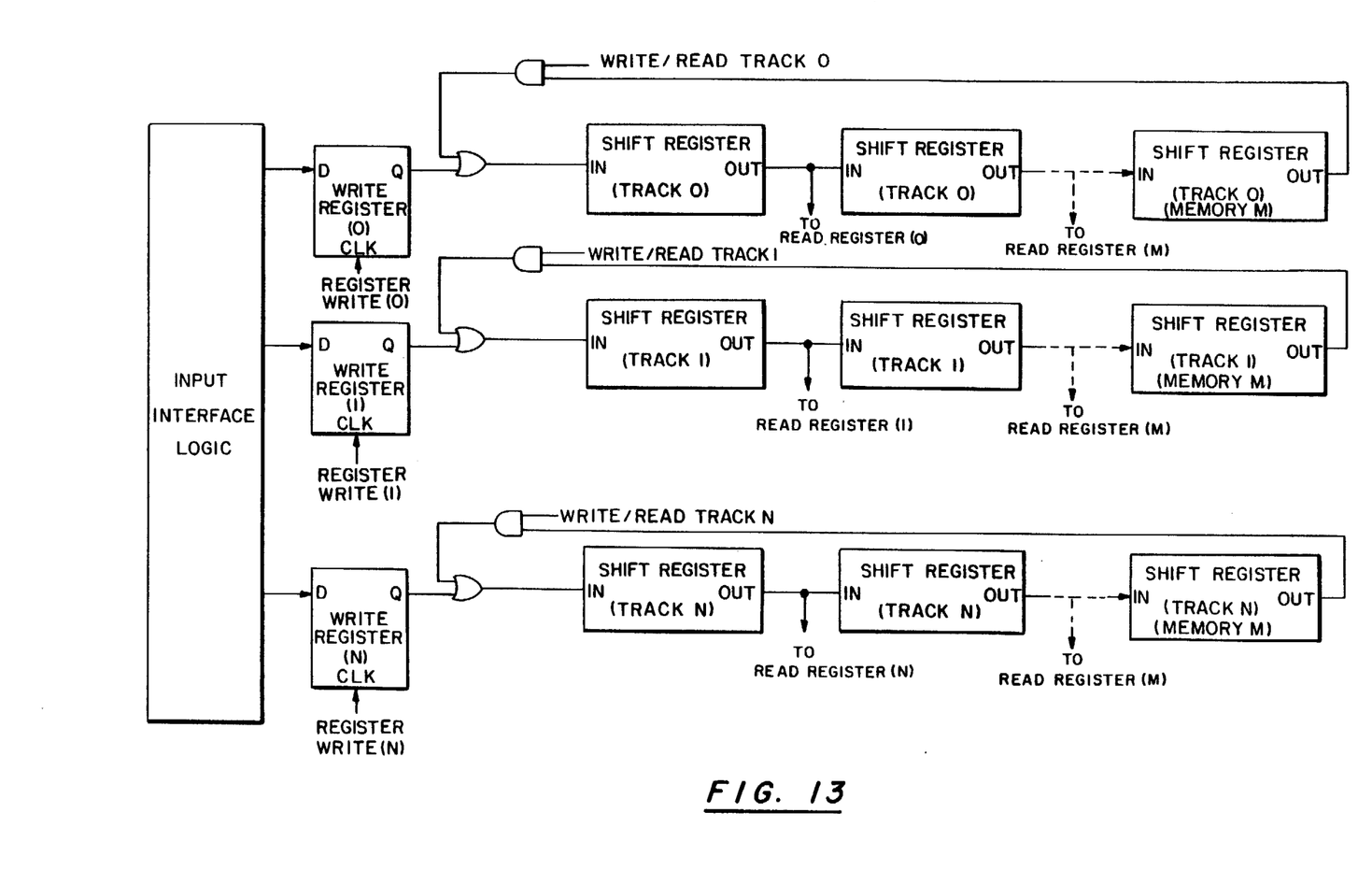
FIG. 13 is a block diagram illustrating read/write registers and logic interface of the present invention.

The memory interface has two sections, the volatile memory interface and the non-volatile memory interface. The volatile memory interface consists of a volatile memory 28 with random access addressing (RAM), read registers 36 and 38, write registers 32 and 34 and interface logic 48. The non-volatile memory interface consists of a non-volatile memory 26 with random access addressing such as a programmable read only memory (PROM), read registers 40, 42, 44 and 46 and interface logic 50.

The volatile memory's interface is used for storage of information from the read registers 36 and 38 and write registers 32 and 34. These read (36, 38) and write (32, 38) registers are equivalent to the read and write heads on a rotational memory. The addressing of the memory is through the output of address multiplexer 18. The clocking of data being read or written into the registers 32, 34, 36 and 38 is controlled by signals from the phase decoder. These signals are in sync with the address multiplexer. The memory's setup times for address stability and data hold time must be assured in generating these control signals. In FIG. 11, the register control signals are register write (0) and register write (1). The number of registers and register control signals (register write) and determined by the number of read and write heads emulated from the rotational memory. It is noted that in FIG. 11 only one read register 36 and one write register 32 is shown for purposes of simplicity of illustration. The memory's word length, word width and access time is determined by the size of rotational memory to be emulated. The greater the number of rotational memory tracks which have multiple heads per track or odd modular length tracks, the faster the memories must be accessed. This is due to the multiplexing of all the offset addresses during one bit clock period. The write signal (see FIG. 11) is used to write data from the write registers into the memory. The signal originates from the phase decoder 14 and is in sync with the timing of the address multiplexer 18. The width of the write signal and its period must conform to the timing requirements of the type of memory used. The interface logic could consist of buffers, line drivers, line receivers or level translators. The type of interface depends on the type of electronics with which the read/write registers will mate. Therefore, this interface cannot be described in detail. It should be noted that the interface must translate the logic levels of the read/write registers to the external logic. In FIG. 11, the memory shown has a maximum address range of 4096. However, depending on the rotational memory to be emulated not all of the memory would have to be used (see terminal count logic).

The non-volatile memory's interface is used for storage of information from the read registers 40, 42, 44 and 46. The read registers are equivalent to the read heads on a rotational memory. The addressing of the memory is through the output of the address multiplexer 18. The clocking of data being read into the registers is controlled by signals from the phase decoder 14. These signals are in sync with the address multiplexer 18. The memory's setup times for address stability and data hold time must be assured in generating these control signals. In FIG. 12, the register control signals are register write (2) and register write (3). The number of registers and register control signals (register write) are determined by the number of read heads that are to be emulated from the rotational memory. It is noted that, for purposes of simplicity of illustration, only two read registers 40 and 42 are illustrated. The memory word length, word width and access time is determined by the size of rotational memory emulated. The greater the number of rotational memory tracks which have multiple heads per track or odd modular length tracks, the faster the access times for the memories are required. This is due to the multiplexing of all the offset addresses during one bit clock period. The interface logic 50 could consist of buffers, line drivers, line receivers, or level translators. The type of interface depends on the type of electronics with which the read registers will mate. Therefore, this interface cannot be described in detail. It should be noted the interface must translate the logic levels of the read registers to the external logic. In FIG. 12, the memory shown has a maximum address range of 4096. However, depending on the rotational memory to be emulated not all of the memory would have to be used (see terminal count logic).

Obviously, many modifications and variations of the present invention are possible in the light of the above teachings. It is therefore to be understood that within the scope of the appended claims the invention may be practiced otherwise than as specifically described.

I claim:

1. A system for emulating the memory characteristics of a motor-driven rotating magnetic drum memory having a plurality of data storage channels on said drum and multiple magnetic heads per data storage channel, each of said data storage channels being positioned circumferentially adjacent to at least one of said other data storage channels comprising:
   means for emulating said multiple magnetic heads per each said data storage channel on said magnetic drum and for emulating a physical separation between each of said multiple magnetic heads per each said data storage channel comprising:
   a clock;
   first means connected to said clock for electronically emulating the rotational timing characteristics of said rotating magnetic drum memory and for generating a series of data address signals;
   second means connected to said first means for receiving said series of data address signals and for changing each of said series of data address signals by a predetermined amount to thereby generate a new series of data address signals;
   third means connected to said second means for electronically emulating said plurality of data storage channels; and
   fourth means connected to said third means for electronically emulating said multiple magnetic heads.

2. The system of claim 1 wherein said clock comprises:
   an oscillator having a master clock output; and
   a phase generator connected to said master clock output.

3. The system of claim 3 wherein:
   said phase generator comprises a shift register having a plurality of outputs.

4. The system of claim 3 wherein said phase generator further comprises:
   a plurality of logic gates connected to said plurality of outputs of said shift register.

5. The system of claim 2 wherein said first means comprises:
   a memory address counter connected to said phase generator;
   a digital magnitude comparator connected to said memory address counter; and
   terminal count means connected to said digital magnitude comparator for determining the maximum count to be reached by said digital magnitude comparator.

6. The system of claim 5 wherein said second means comprises:
   a plurality of non-volatile memories; and
   a multiplexer connected to said plurality of non-volatile memories.

7. The system of claim 6 wherein each of said plurality of non-volatile memories comprises a programmable read only memory.

8. The system of claim 1 wherein said second means comprises:
   a plurality of non-volatile memories; and
   a multiplexer connected to said plurality of non-volatile memories.

9. The system of claim 8 wherein each of said plurality of non-volatile memories comprises a programmable read only memory.

10. The system of claim 6 wherein said third means comprises:

a volatile memory; and a non-volatile memory.

11. The system of claim 10 wherein:

said third means volatile memory comprises a random access memory.

12. The system of claim 10 wherein said third means non-volatile memory comprises a programmable read only memory.

13. The system of claim 12 wherein said forth means comprises a plurality read data registers and at least one write data register.

14. The system of claim 10 wherein said fourth means comprises a plurality read data registers and at least one write data register.

15. The system of claim 1 wherein said fourth means comprises a plurality read data registers and at least one write data register.

16. The system of claim 6 wherein said second means further comprises:

a plurality of offset decoders connected to the input of said multiplexer.

17. The system of claim 8 wherein said second means further comprises:

a plurality of offset decoders connected to the input of said multiplexer.

* * * * *